United States Patent Office 2,852,344
Patented Sept. 16, 1958

2,852,344

PRODUCTION OF AMMONIA FROM BLAST FURNACE GAS

Herbert Kölbel, Moers, Germany, assignor to Rheinpreussen Aktiengesellschaft für Bergbau und Chemie, Homberg, Lower Rhine, Germany, a German corporation No Drawing. Application November 12, 1953
Serial No. 391,721

Claims priority, application Germany November 13, 1952

9 Claims. (Cl. 23—198)

This invention relates to new and useful improvements in the utilization of blast furnace gas. It more particularly relates to the utilization of blast furnace gas for synthesis purposes.

The catalytic hydrogenation of carbon monoxide for the production of valuable synthesis products such as hydrocarbons according to the Fischer-Tropsch process is well known. In this reaction a carbon monoxide hydrogen-containing gas is used as the starting synthesis gas. The synthesis process may also be effected by reacting the carbon monoxide with steam instead of with hydrogen in accordance with the more recent Kolbel-Engelhardt process. The economic success of these synthesis processes depends to a great part upon the initial cost of the starting synthesis gas, and on the degree of utilization of the materials contained therein.

One object of this invention is the use of relatively inexpensive waste gas obtained from the melting of iron ores in blast furnaces for synthesis purposes with a high utilization of all the components contained therein.

This, and still further objects, will become apparent from the following description:

In accordance with the invention, a relatively inexpensive starting gas is used, with utilization of all its constituents by a combination of iron smelting with a hydrocarbon and ammonia synthesis.

The starting gas in accordance with the invention is practically sulfur-free waste gas obtained from the melting of iron ore in blasting furnaces. A considerable portion of this blast furnace waste gas previously had to be burned in waste gas torches, inasmuch as there was no possibility of its use in the metallurgical plants. This starting gas in accordance with the invention may be any practically sulfur-free waste blast furnace gas obtained from the smelting of iron ores, irrespective of whether the blasting is effected with air or oxygen-rich air. This gas will be referred to hereinafter as blast furnace gas.

Blast furnace gas essentially consists of carbon monoxide and nitrogen and has been found highly suitable for hydrocarbon synthesis, inasmuch as, due to the nature of the smelting process, it is practically sulfur-free. The expensive sulfur scrubbing units conventionally required for treating gas for the Fischer-Tropsch synthesis are therefore not necessary.

The blast furnace gas in accordance with the invention is passed in contact with a carbon monoxide hydrogenation catalyst under synthesis conditions after the addition thereto of hydrogen and/or steam to form a synthesis gas.

The carbon monoxide hydrogenation with the use of the blast furnace gas may be effected in accordance with the conventional Fischer-Tropsch synthesis or the recent Kolbel-Engelhardt synthesis. All the synthesis conditions, including catalyst, gas load, CO to $H_2$ and/or steam ratio, pressure, temperature, throughput, etc., are all, as is known, as conventional for these processes.

When operating in accordance with the conventional Fischer-Tropsch synthesis, the blast furnace gas may be converted into synthesis gas by the admixture of hydrogen or hydrogen and carbon monoxide to form a gas having the conventional $CO:H_2$ ratio used in the Fischer-Tropsch synthesis. It is also possible to add the hydrogen by reacting a portion of the carbon monoxide in the blast furnace gas in the known manner with water and removing the $CO_2$.

When operating the carbon monoxide hydrogenation in accordance with the Kolbel-Engelhardt process, the blast furnace gas may be admixed with steam to form the synthesis gas without the use of the costly hydrogen.

It has been found preferable in accordance with the invention to effect the carbon monoxide hydrogenation with the hydrogen or steam, using highly active iron catalysts, inasmuch as with the use of these catalysts carbon dioxide formation takes place during the synthesis to a far-reaching extent. This carbon dioxide, which is present in the final or exit gas from the synthesis may be returned to the smelting process for the re-formation of carbon monoxide by reaction with the coke. It is also possible to return the carbon dioxide obatined in the synthesis to a conventional gasification process for the further formation of carbon monoxide. This may be effected, for example, by the reduction of the carbon dioxide on a glowing coke bed.

The carbon dioxide so obtained can furthermore be used in the metallurgical steel plants as, for example, for the converting of steel.

The removal of the carbon dioxide from the final gases of the Fischer-Tropsch or Kolbel-Engelhardt synthesis may be effected in any conventional manner, and preferably by a pressure water washing.

The final gas from the synthesis after the removal of the liquid and gaseous synthesis products and after the carbon dioxide removal consists predominantly of nitrogen which may still contain small quantities of carbon dioxide, carbon monoxide, hydrocarbons and hydrogen. This gas, however, is still sulfur-free, and it has been found excellently suited for conventional ammonia synthesis after removal of the small quantities of carbon dioxide and carbon monoxide still remaining. These small quantities of carbon dioxide and carbon monoxide may be removed in the conventional manner.

The gases, after this conventional carbon dioxide removal, contain, for example, 93–94% nitrogen, and are completely sulfur-free. The quantities of $CO_2$ removed from this nitrogen gas may, as described above, be recycled to the smelting process, etc. The carbon monoxide obtained in the purification may be fed to the synthesis together with the blast furnace waste gas.

In addition, the low molecular hydrocarbons formed in the synthesis may also be fed to the smelting process. The nitrogen gas is utilized by addition with hydrogen in the ammonia synthesis. By use of the above-described combination there is obtained a practically complete industrial utilization of all the gas components of the blast furnace waste gas obtained in the smelting of iron and the production of a group of valuable products.

The following example is given by way of illustration and not limitation:

Example 1000 meters (N. T. P.) blast furnace waste gas of a composition

| | Percent |
|---|---|
| $CO_2$ | 7.0 |
| $CO$ | 34.0 |
| $H_2$ | 2.0 |
| $N_2$ | 57.0 | are mixed with 96.4 kilograms of steam and conducted at a pressure of 10–20 atmospheres gauge and a velocity of about 400–500 volumes of gas per volume of reaction space and a temperature of about 250° C. through a hydrocarbon synthesis furnace. The furnace is provided with a cooling device, and contains a catalyst consisting of about 100 parts Fe, 10 parts Cu, 10 parts Mg, 50 parts kieselguhr, and 4% $K_2CO_3$.

In the synthesis there are produced with a CO conversion of 94%, 53 kg. hydrocarbons of a carbon number of $C_2$ and higher, which are removed from the residual gas in the known manner by pressure scrubbing or absorption, and 9 kg. hydrocarbons of a carbon number of $C_2$ and lower, which remain in the residual gas.

The final gas amounting to 920 cubic meters (N. T. P.) has the composition

|  | Percent |
|---|---|
| $CO_2$ | 31.4 |
| CO | 2.2 |
| $H_2$ | 3.3 |
| Hydrocarbons (carbon number 1.5) | 1.1 |
| $N_2$ | 62.0 |

By a scrubbing with water under pressure and alkali media, the carbon dioxide (maximum 288 cubic meters) is scrubbed out of this final gas and returned to the smelting process or used for the converting of steel. The gas scrubbed in this manner (630 cubic meters) has the following composition:

|  | Percent |
|---|---|
| CO | 3.2 |
| $H_2$ | 4.7 |
| Hydrocarbons (carbon number 1.5) | 1.6 |
| $N_2$ | 90.5 |

The carbon monoxide is scrubbed from this gas in the known manner with copper salt solutions and the gas resulting therefrom (610 cubic meters) has the following composition:

|  | Percent |
|---|---|
| $N_2$ | 93.5 |
| $H_2$ | 4.8 |
| Hydrocarbon | 1.6 |

This gas containing almost 94% $N_2$ is absolutely free of sulfur and can therefore be fed directly to a known ammonia synthesis. The CO which has been scrubbed out is added to the blast furnace waste gas present in the synthesis furnace.

In this way all constituents of the blast furnace waste gas are given a profitable use, neither the blast furnace waste gas nor the nitrogen gas being subjected to a sulfur scrubbing.

I claim:

1. Method for the utilization of substantially sulfur free blast furnace waste gases obtained from iron smelting which gas essentially consists of carbon monoxide and nitrogen and contains a small amount of carbon dioxide, hydrogen and hydrocarbons, which comprises passing such a practically sulfur-free blast furnace waste gas in the presence of a member selected from the group consisting of hydrogen, steam, and mixtures thereof in contact with a carbon monoxide hydrogenation catalyst under synthesis conditions of temperature and pressure, recovering the synthesis products obtained, recovering from the gas after said contacting the carbon dioxide produced from said contacting under synthesis conditions along with any residual carbon dioxide present in said waste gas, and thereafter passing the gas said gas being substantially pure nitrogen and entirely sulfur free in contact with an ammonia synthesis catalyst under ammonia synthesis conditions and recovering the ammonia produced.

2. Method according to claim 1, in which said group member is admixed with said blast furnace waste gas prior to said contacting with said carbon monoxide hydrogenation catalyst.

3. Method according to claim 1, in which a portion of the carbon monoxide in said blast furnace waste gas is reacted with water to form hydrogen and carbon dioxide and in which said carbon dioxide is removed prior to said contacting with said carbon monoxide hydrogenation catalyst.

4. Method according to claim 1, in which said carbon monoxide hydrogenation catalyst is an iron containing catalyst.

5. Method according to claim 1, in which the carbon dioxide is removed from the final gas after said contacting with the carbon monoxide hydrogenation catalyst by a pressure water washing.

6. Method according to claim 1, in which said recovered carbon dioxide is converted to carbon monoxide and recycled for said contacting with said carbon monoxide hydrogenation catalyst.

7. Method according to claim 1, in which said recovered carbon dioxide is recycled to the iron smelting.

8. Method acccording to claim 1, in which said recovered carbon dioxide is utilized for the converting of steel.

9. Method according to claim 1, in which small quantities of residual carbon dioxide, carbon monoxide and hydrocarbons are removed from the gas after said recovery of carbon dioxide and prior to said contacting with said ammonia synthesis catalyst.

References Cited in the file of this patent

UNITED STATES PATENTS

| 1,667,322 | Larson | Apr. 24, 1928 |
| 1,794,231 | Humphrey | Feb. 24, 1931 |
| 1,851,762 | Fahrenhorst et al. | Mar. 29, 1932 |
| 2,014,757 | Blondelle | Sept. 17, 1935 |
| 2,337,551 | Hansgirg | Dec. 28, 1943 |